ARRANGEMENT FOR CONTROLLING A TRANSISTOR CIRCUIT

Filed Nov. 12, 1957

Inventor
Hans Neidhardt
by: Michael S. Striker
Attorney

United States Patent Office 2,903,608

Patented Sept. 8, 1959

2,903,608

ARRANGEMENT FOR CONTROLLING A TRANSISTOR CIRCUIT

Hans Ulrich Neidhardt, Zurich, Switzerland, assignor to H. A. Schlatter Aktiengesellschaft, Zurich, Switzerland Application November 12, 1957, Serial No. 695,969

Claims priority, application Switzerland November 12, 1956

10 Claims. (Cl. 307—88.5)

Figure 1:
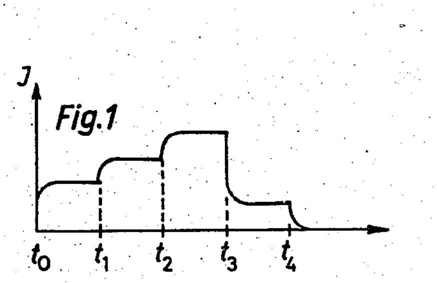

The present invention refers to an arrangement for modulating a transistor circuit, and more specifically for modulating a transistor in a control circuit by means of a plurality of mutually independent timing circuits.

An arrangement of this type is particularly suitable for controlling in transistor-controlled program-scheduled electric welding machines the whole time sequence and schedule by purely electronic means. In this application the arrangement in question permits also the production of exactly controlled increase and decrease performances, also known by the name "slope control."

It is a main purpose of the present invention to provide an arrangement of the type set forth that will eliminate a number of difficulties known to occur with known equipment of this general class.

It is a further object of this invention to provide an arrangement of the type set forth which is composed of a comparatively small number of elements which assure reliable and economical performance.

The present invention is particularly adapted to be applied to or combined with means for electronically controlling the welding current of welding apparatus, comprising among other elements a main transistor as described for instance by my copending patent application Serial No. 657,312.

With above objects in view, an arrangement according to the present invention mainly comprises a plurality of auxiliary transistors which are associated with the above-mentioned main transistor and which act only as switch elements; the individual emitter circuits of these auxiliary transistors are respectively connected with a timing circuit of a program switch, but they are blocked in non-operative condition by an impressed bias potential; the collector circuits of these auxiliary transistors are connected in parallel and control the emitter circuit of the main transistor. By means of such an arrangement in accordance with the invention it is possible to prevent the individual timing circuits to affect each other so that under these circumstances the voltages applicable to each particular program period can be selected freely. Moreover, it is also possible in this manner to prevent the main transistor and its pertaining circuit elements to have any effects on the individual timing circuits; therefore, it is even possible to connect the main transistor, for instance, also with an additional timing circuit which may produce for the control circuit of the above-mentioned main transistor a varying potential. Consequently it is then possible to solve according to the invention in a particularly advantageous and novel form the problem of producing in the welding transformer a controlled increasing and decreasing load.

Figure 2:
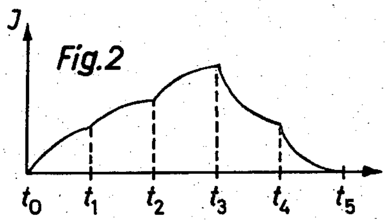
Figure 3:
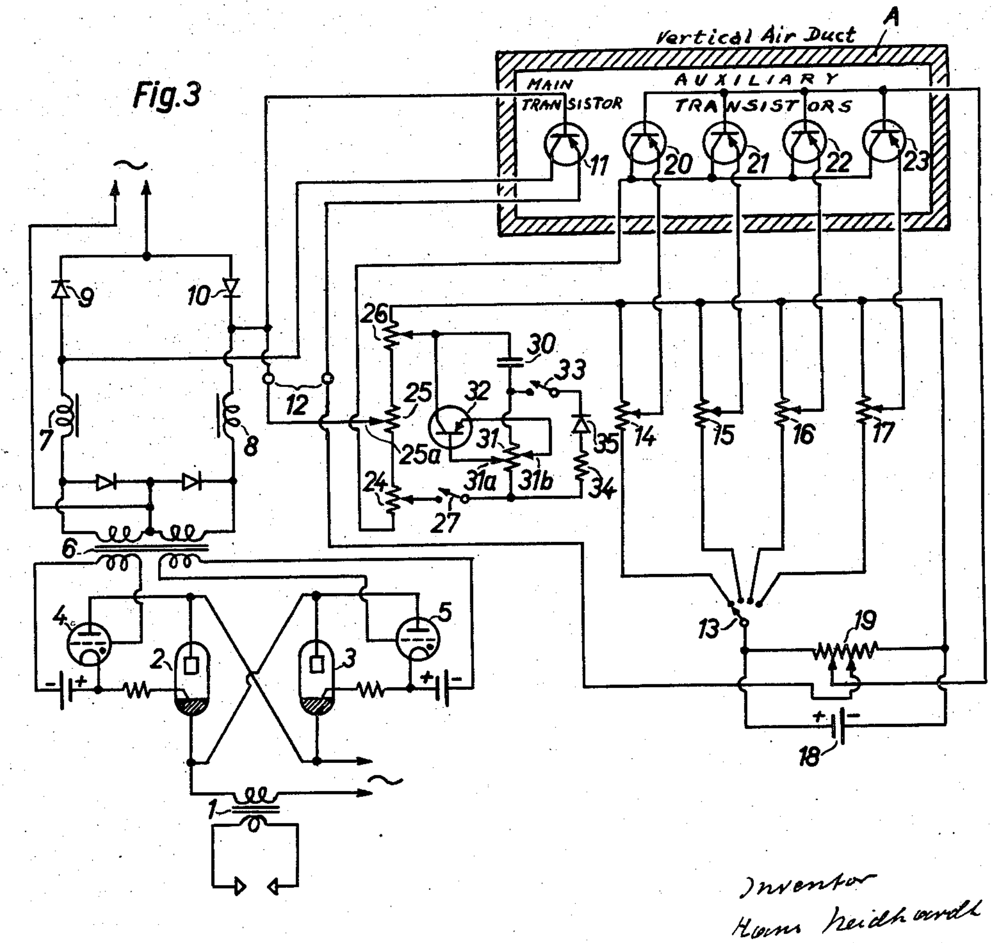

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 1 and 2 are two current diagrams showing by way of example two different types of program schedules for a welding apparatus; and Fig. 3 is a wiring diagram illustrating one embodiment of the invention.

In Figs. 1 and 2 the changes of the actual welding current J are indicated in relation to time $t$. The program illustrated by Fig. 1 is based on a welding current which increases in steps during three time periods or intervals marked by $t_1$, $t_2$, $t_3$. Evidently, for carrying out a program as illustrated by the diagram in Fig. 1, a program switch must be capable of controlling the energy which is supplied to the welding transformer so that in corresponding intervals this current is increased and decreased in steps. Up to now a control of this type was frequently attempted by using a system of contacts controlled by synchronous motors, said contacts being used to control directly or through suitable gas-filled discharge tubes the welding current.

The program according to Fig. 2 differs from that represented by Fig. 1 in that the current does not increase and decrease in distinct steps, but gradually. For carrying out this type of a program evidently a program switch of conventional type would have to be used for actuating one after the other a plurality of separate time controlled devices which then would have to produce at a given moment a gradually increasing or decreasing control voltage for the control of the welding current.

In the arrangement according to Fig. 3 the primary winding of the welding transformer 1 is in circuit with the two ignitrons 2 and 3 which are controlled in a well-known manner by two gas-filled triodes 4 and 5, respectively. The negatively biased grids of the triodes 4, 5 are in circuit with separate secondary windings of a control transformer 6 which in turn is connected to the A.C. power line via a self saturating magnetic amplifier. This magnetic amplifier mainly consists of a circuit divided into two branches, the two branches comprising each a valve means 9 and 10, respectively. The valves are connected in the circuit in such a manner that the directions in which they permit current to pass are opposite each other. Between each valve 9, 10 and its respective choke coil 7, 8 there is a junction point, and these two junction points are connected by a cross connection which includes the transistor 11. As is explained in detail in my copending patent application, Serial No 657,312, it is possible in this arrangement by impressing a control potential on the terminals 12 of the control circuit of the transistor 11, to adjust the inductive resistance of the whole branched circuit 7–10 between a maximum and almost zero so that hereby the phase at which the ignitrons 2, 3 are ignited are shifted between 40° and 180°.

While the arrangement described up to this point generally is the subject matter of my above-mentioned copending application, according to the present invention the remainder of the arrangement shown in Fig. 3 is connected to the terminals 12 of the magnetic amplifier circuit. This additional arrangement according to the invention serves to control the performance of the transistor 11 which here is called the main transistor, in accordance with a program substantially as for instance illustrated by Figs. 1 or 2. Essentially the control circuit just mentioned comprises a program switch which is diagrammatically represented by the circle and arrow 13 and may be of the mechanical or electronic type. In the present example this switch 13 is provided with four terminals which are individually and respectively connected with a plurality of potentiometers 14–17. Th switch 13 is therefore adapted to apply to said potentiometers the positive potential of a D.C. source, which may for instance be the battery 18. It is to be noted that the said positive potential is applied to the various potentiometers in a predetermined and adjustable sequence and timing.

It may appear possible to connect the taps of the potentiometers 14–17 directly with the control terminals 12 of the main transistor 11. However, it has been found that if this be done the most undesirable consequence would be that the individual segments of the program schedule would affect each other. Therefore, in accordance with the invention, a number of auxiliary transistors 20–23 are provided each being associated with one of the potentiometers 14–17, and the emitter circuits of each of these auxiliary transistors being controlled by the associated potentiometer. The collector circuits of said auxiliary transistors are connected in parallel and are supplied by a potentiometer 19 with a suitable potential, while they are otherwise in circuit with a load constituted by a series of potentiometers 24, 25 and 26. One of the control terminals 12 of the main transistor 11 is connected with a second tap of the potentiometer 19, while the other terminal of the transistor 11 is connected to a tap of the load potentiometer 25.

To the right, as seen in the diagram Fig. 3, of the series of potentiometers 24, 25, 26 a special circuit of an adjustable time control arrangement is shown, which however is separated from the rest of the circuit by a switch 27 and will be described in detail further below. When the switch 27 is in open position the operation of the whole arrangement is as follows:

As is evident the transistors 20–23 are blocked in non-operative condition by the negative bias of their respective emitter. Consequently, the emitter of the main transistor 11 is positive with respect to its base electrode, and the inductive resistance of the magnetic amplifier 7–10 has its maximum value; the moment of ignition of the ignitrons 2, 3 therefore is so late that the welding transformer 1 remains without supply of current.

Assuming now, that the program switch 13 first applies a potential to the potentiometer 14 then the transistor 20 permits current to pass and thereby creates a voltage drop in the potentiometer series 24–26 whereby the base potential of the main transistor 11 is shifted towards the positive side. Consequently, its emitter becomes less positive with respect to its base electrode and thereby the capability of the transistor 11 to permit current to pass decreases. Due to this however the inductive resistance of the magnetic amplifier 7–10 also decreases, and the two ignitrons 2, 3 ignite at an earlier phase: therefore the welding current is started and its strength depends solely upon the adjustment of the potentiometer 14.

Analogous performances are obtained if and when by the program switch 13 subsequently, i.e. after termination of the time interval $t_1$–$t_0$ a potential is applied to the potentiometer 15 for the duration of a time interval $t_2$–$t_1$. The welding current required during this time interval can be adjusted and controlled by setting the potentiometer 15, and it can be seen that in this manner any desired program control according to Fig. 1 can be preset and carried out.

The above-mentioned time control arrangement which is disconnected by opening the switch 27, comprises essentially an exchangeable electrolyte-condenser 30 of a magnitude approximately between 100 and 1000 microfarads, further a series resistance 31 and a transistor 32 which adjustably influences the charging and discharging of the condenser 30. For this purpose the base electrode and the emitter of the transistor 32 are respectively connected with independently movable taps 31*a* and 31*b* of the resistor 31. Finally another resistor 34 may be connected in parallel with the resistor 31 but disconnectable by a switch 33, a valve means 35 being in that circuit in series with the resistor 34 so that, depending upon the orientation or polarity of the valve means 35 the charging and discharging performance of the condenser 30 can be influenced exclusively.

The performance of the just-described time control arrangement is the following: When the switch 27 is moved into closed position and the program switch 13 is started to operate, so that for instance a potential is applied to the potentiometer 14 whereby the transistor 20 is caused to permit passage of a current, then this particular current will first of all charge the condenser 30 so that the voltage drop in the potentiometers 24, 25, 26 controlling the main transistor 11 via the tap 25*a*, develops only with a corresponding delay. To the correspondingly gradual increase of the control potential at the transistor 11 corresponds a correspondingly gradual increase of the primary current which is supplied to the welding transformer 1 by the ignitrons 2, 3; therefore in the welding circuit a current is created the curve of which would be illustrated by the segment of the current curve in Fig. 2, as shown between the ordinates at $t_0$ and $t_1$. When subsequently the program switch 13 proceeds to a position controlling the potentiometer 15 which creates through the transistor 21 a charging current for the condenser 30 which is still stronger, then the curve segment mentioned above is extended by a similarly rising curve segment between the ordinates at $t_1$ and $t_2$. A similar performance would occur in the next following time interval according to the program, as represented by the curve segment between the two ordinates $t_2$ and $t_3$.

If finally the program switch 13 moves into a position in which it controls the potentiometer 17, the transistor 24 of which would pass, according to the setting of this potentiometer, only a comparatively weak current, then the condenser 30 would discharge its charge across the series of resistors 24, 25, 26 so as to supplement said weak current. Consequently, the positive bias of the tap 25*a* would decrease only slowly whereby a gradually decreasing control potential is transmitted to the main transistor 11. On account of this fact the welding transformer 1 would generate in the time interval between the ordinate $t_3$ and the ordinate $t_4$ a gradually decreasing welding current, and this performance is further continued automatically after the switch 13 has disconnected the potentiometer 17 entirely, because during the following period the condenser 30 continues to discharge itself until it is entirely or substantially discharged at the time $t_5$. The form of the rising and dropping current curves according to Fig. 2 can be influenced in generally known manner for instance by exchanging the condenser 30 or the resistor 31. Moreover it is possible by closing the switch 33, to obtain an increase of the speed of charging of the condenser 30 without changing the time required for its discharge. However it has been found that of particular value for the control of the particular time control arrangement is the transistor 32 which has entirely different effects depending upon the chosen position of the taps 31*a* and 31*b*, respectively. If the tap 31*a* is positioned further away from the condenser 30 than the tap 31*b* then the base electrode of the transistor 32 has during the charging of the condenser a higher positive potential than its emitter; therefore the transistor 32 is blocked and consequently does not have any influence on the charging action. However during the discharge the emitter is then more positive than its base electrode so that a current flows from the base electrode to the collector whereby the discharge of the condenser 30 is accelerated. However if the tap 31*b* is positioned further away from the condenser 30 than the tap 31*a* then the conditions are reversed; the transistor would then accelerate the charging action while the discharge of the condenser 30 is not influenced by the transistor. Besides, in both cases the curve representing the thus controlled charge and discharge actions is straightened to a certain extent so as to represent a rather linear function; however the degree of this straightening effect depends among other factors also upon the absolute position of the taps **31*a* and 31*b* along the resistance 31**.

It is further possible to control and adjust the curvature and the starting points of every curved and rising or falling segment of the current curve according to Fig. 2. This can be obtained by changing the position of the adjustable taps of the potentiometers 24 and 26 since the above-described time control arrangement is connected with the source of potential 18 by means of the just-mentioned taps. The resistance of the potentiometer 24 should be selected in this context so that it exceeds the resistance of the potentiometer 26 by a multiple of the latter.

It is known that by changes in the operating temperature of a transistor a change of its control characteristics is caused which, for practical purposes can be considered to be approximately equal to a shift of this characteristic in a manner that it remains parallel with itself. As can be derived from Fig. 3 a current increase caused hereby in the collector circuits of the auxiliary transistors 20–23 would cause a reduction of the controlled current in the transistor 11. If, however, both the main transistor and an operatively connected auxiliary transistor are subjected to the same change of temperature then the corresponding changes of current occur in opposite directions and therefore the corresponding resistances 14–17, 24–26, respectively, can be adjusted or selected in such a manner that these current changes compensate each other to a very substantial degree. This is a very important advantage of the arrangement described above. In order to be able to make full use of this advantage, the auxiliary and main transistors of arrangements according to the invention may be arranged or mounted so closely adjacent to each other that for all practical purposes they are all subjected to equal temperature conditions. It is most advisable to mount them all in one common air chamber or duct A, shown diagrammatically in horizontal cross-section in Fig. 3.

It will be understood that each of the elements described above, or two or more together, may also find a useful application in other types of arrangements for controlling a transistor circuit differing from the types described above.

While the invention has been illustrated and described as embodied in arrangements for controlling a transistor circuit depending upon a plurality of mutually independent timing circuits, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a transistor control circuit, particularly for transistor-controlled program-schedule electric welding apparatus, in combination, a main transistor having a base electrode, a collector electrode and an emitter electrode; a control circuit connecting said base electrode and said emitter electrode for varying the impedance of said main transistor, said control circuit including a source of direct current potential; a plurality of auxiliary time control circuits connected, in parallel with each other, on one hand, to the negative pole of said source and containing each a potentiometer having a movable tap for deriving a desired partial potential therefrom, a time control switch means connected with the positive pole of said source and, on the other hand, with said control circuits and movable into a plurality of alternative positions in which it completes said auxiliary circuits, respectively; an auxiliary transistor associated with each of said auxiliary time control circuits, respectively, the emitter electrode thereof being connected with said movable tap of the potentiometer of the associated control circuit, the collector electrode of all of said auxiliary transistors being also connected, in parallel with each other, with said negative pole of said source, and the base electrodes of all of said auxiliary transistors being connected, in parallel with each other, with said positive pole of said source; control potentiometer means having at least one movable control tap and being connected in the circuit between said collector electrodes of said auxiliary transistors and said negative pole, said movable control tap being connected with said base electrode of said main transistor; and adjustable potentiometer means in parallel with said source of direct current potential for adjusting the potential derived therefrom for being impressed on said emitter electrode of said main transmitter and for adjusting the potential derived from said source for being applied to the base electrodes of said auxiliary transistors, whereby when said time control switch is in a position in which none of said auxiliary time control circuits is completed, all of said auxiliary transistors are blocked by the negative potential applied to their emitter electrodes, and the emitter electrode of the main transistor has a positive potential with respect to its base electrode and has minimum impedance, while when said time control switch is in any one of the positions in which one of said auxiliary time contro circuits is completed, the associated auxiliary transisto allows current to pass from the direct current sourc through said control potentiometer, the strength of suc current being determined by the adjustment of the poten tiometer in the particular auxiliary time control circuit so that the potential at the base electrode of the mai transistor is accordingly modified so as to increase th impedance of the latter.

2. An arrangement as set forth in claim 1, including secondary time control circuit connected in parallel wit said control potentiometer and comprising a series com bination of a resistor and a condenser which is charge when any one of said auxiliary transistors is caused to al low current to flow through said control potentiomete means, whereby the potential at the base electrode of th main transistor and the impedance thereof are change gradually due to the capacitive delay effect of said con denser.

3. An arrangement as set forth in claim 2, said sec ondary time control circuit including a secondary con trol transistor, and said resistor of said series combina tion being a potentiometer with movable tap means, th control connection of said secondary control transisto being in circuit with said movable tap means, while th collector electrode thereof is connected with a junctio point located between said condenser and said contr potentiometer, whereby the charging and dischargin speed of said condenser is modified depending upon th adjustment of said movable tap means along said pote tiometer in said series combination.

4. An arrangement as set forth in claim 2, said secon ary time control including an auxiliary circuit in parall with said resistor of said series combination, said au iliary circuit comprising an auxiliary resistor and a un directional valve member in series therewith, for modif ing the charging and discharging operation of said co denser depending upon the polarity of said valve memb in said auxiliary circuit.

5. An arrangement as set forth in claim 2, said co trol potentiometer means having a second movable ta connected with one end of said secondary time contr circuit, and a third movable tap connected with the oth end of said secondary time control circuit so that depen ing upon the adjustment of said second and third movab taps different portions of the total voltage drop across said control potentiometer means can be applied to said secondary time control circuit.

6. An arrangement as set forth in claim 1, wherein said auxiliary transistors are mounted immediately adjacent to said main transistor so that all of said transistors are equally affected by occurring variations of the ambient temperature.

7. An arrangement as set forth in cliam 6, wherein said auxiliary transistors and said main transistor are mounted in a common substantially vertical air duct.

8. In a transistor control circuit, particularly for transistor-controlled program-schedule electric welding apparatus, comprising, in combination, a main transistor having a base electrode, a collector electrode and an emitter electrode; a control circuit connecting said base electrode and said emitter electrode for varying the impedance of said main transistor, said control circuit including a source of direct current potential; a plurality of auxiliary time control circuits connected, in parallel with each other, on one hand, to the negative pole of said source and containing each a potentiometer having a movable tap for deriving a desired partial potential therefrom, a time control switch means connected with the positive pole of said source, and, on the other hand, with said control circuits and movable into a plurality of alternative positions in which it completes said auxiliary circuits, respectively; an auxiliary transistor associated with each of said auxiliary time control circuits, respectively, the emitter electrode thereof being connected with said movable tap of the potentiometer of the associated control circuit, the collector electrodes of all of said auxiliary transistors being also connected, in parallel with each other, with said negative pole of said source, and the base electrodes of all of said auxiliary transistors being connected, in parallel with each other, with said positive pole of said source; control potentiometer means having at least one movable control tap and being connected in the circuit between said collector electrodes of said auxiliary transistors and said negative pole, said movable control tap being connected with said base electrode of said main transistor; adjustable potentiometer means in parallel with said source of D.C. potential for adjusting the potential derived therefrom for being impressed on said emitter electrode of said main transmitter and for adjusting the potential derived from said source for being applied to the base electrodes of said auxiliary transistors; a secondary time control circuit connected in parallel with said control potentiometer and comprising a series combination of a resistor and a condenser which is charged when any one of said auxiliary transistors is caused to allow current to flow through said control potentiometer means; said secondary time control circuit including a secondary control transistor, and said resistor of said series combination being a potentiometer with movable tap means, the control connection of said secondary control transistor being in circuit with said movable tap means, while the collector electrode thereof is connected with a junction point located between said condenser and said control potentiometer; said secondary time control circuit including an auxiliary circuit in parallel with said resistor of said series combination, said auxiliary circuit comprising an auxiliary resistor and a unidirectional valve member in series therewith, for modifying the charging and discharging operation of said condenser depending upon the polarity of said valve member in said auxiliary circuit; said control potentiometer means having a second movable tap connected with one end of said secondary time control circuit, and a third movable tap connected with the other end of said secondary time control circuit so that depending upon the adjustment of said second and third movable taps different portions of the total voltage drop across said control potentiometer means can be applied to said secondary time control circuit.

9. In a transistor control circuit, particularly for transistor controlled program-schedule electric welding apparatus, in combination, a main transistor; a plurality of selectively operable time control circuits operatively connected with said main transistor for varying the impedance thereof; a plurality of auxiliary transistors respectively associated with said time control circuits for being selectively actuated by the latter, the input of each of said auxiliary transistors being connected with the associated time control circuit, the outputs of all of said auxiliary transistors being connected in parallel with each other and with the input of said main transistor for applying selected input potentials to the latter; and electrical means for blocking each one of said auxiliary transistors when it is not actuated by the associated one of said time control circuits, whereby the impedance of said main transistor is varied depending upon the selective operation of said time control circuits.

10. In a transistor control circuit, particularly for transistor controlled program-schedule electric welding apparatus, in combination, a main transistor circuit; a control circuit operatively connected to said main transistor circuit and including a source of direct current potential and means for adjusting a control potential derived from said source of potential and applied to said main transistor circuit; a plurality of auxiliary transistors in circuit with said source of potential and operatively connected with said control circuit for varying the impedance of said main transistor circuit; and a plurality of auxiliary time control circuits selectably connectible with said source of potential and with said auxiliary transistors, respectively, and including variable control means for adjusting the output of said auxiliary transistors applied to said control circuit, whereby depending upon the adjusted output of a selected one of said auxiliary transistors the impedance of said main transistor circuit is accordingly modified.

No references cited.